United States Patent
Zheng

(10) Patent No.: US 10,132,981 B2
(45) Date of Patent: Nov. 20, 2018

(54) LIGHT GUIDE PLATE, BACKLIGHT MODULE OF LIQUID CRYSTAL DISPLAY PANEL, AND DEVICE FOR MANUFACTURING LIGHT GUIDE PLATE

(71) Applicant: Shenzhen China Star Optoelectronics Technology Co., Ltd., Shenzhen, Guangdong (CN)

(72) Inventor: Yingbo Zheng, Guangdong (CN)

(73) Assignee: SHENZHEN CHINA STAR OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 14/417,822

(22) PCT Filed: Jan. 21, 2015

(86) PCT No.: PCT/CN2015/071223
§ 371 (c)(1),
(2) Date: May 6, 2016

(87) PCT Pub. No.: WO2016/106903
PCT Pub. Date: Jul. 7, 2016

(65) Prior Publication Data
US 2016/0245978 A1      Aug. 25, 2016

(30) Foreign Application Priority Data
Dec. 31, 2014 (CN) .......................... 2014 1 0855642

(51) Int. Cl.
*F21V 8/00* (2006.01)

(52) U.S. Cl.
CPC .......... *G02B 6/0036* (2013.01); *G02B 6/0016* (2013.01); *G02B 6/0021* (2013.01); *G02B 6/0038* (2013.01); *G02B 6/0065* (2013.01)

(58) Field of Classification Search
CPC .. G02B 6/0036; G02B 6/0016; G02B 6/0021; G02B 6/0038; G02B 6/0065
(Continued)

(56) References Cited

U.S. PATENT DOCUMENTS

2004/0145915 A1* 7/2004 Kim ..................... G02B 6/0036
                                                                  362/559
2008/0129925 A1* 6/2008 Han ................. B29D 11/00663
                                                                  349/65
(Continued)

FOREIGN PATENT DOCUMENTS

CN            2496052        6/2002
CN          102043186        5/2011
(Continued)

OTHER PUBLICATIONS

International Search Report and Written Opinion, dated Jan. 21, 2015, China.
(Continued)

*Primary Examiner* — Anh Mai
*Assistant Examiner* — Jessica M Apenteng
(74) *Attorney, Agent, or Firm* — Kim Winston LLP

(57) ABSTRACT

Disclosed are a light guide plate, a backlight module of a liquid crystal display device, and a device for manufacturing the light guide plate. The light guide plate comprises a first surface and a second surface parallel with each other, wherein the first surface is formed with parallel columnar projections, and the second surface is formed with light guide ports. The light guide plate has a better light convergence effect compared with an existing light guide plate. As a result, light crosstalk in the light guide plate can be significantly attenuated.

4 Claims, 5 Drawing Sheets

(58) Field of Classification Search
USPC .......................................................... 362/611
See application file for complete search history.

(56) References Cited

U.S. PATENT DOCUMENTS

| | | | |
|---|---|---|---|
| 2008/0309849 A1 | 12/2008 | Yang | |
| 2012/0014136 A1 | 1/2012 | Lee et al. | |
| 2013/0336005 A1 | 12/2013 | Chen et al. | |
| 2014/0078775 A1* | 3/2014 | Lee | G02B 6/0011 |
| | | | 362/606 |
| 2015/0138833 A1 | 5/2015 | He | |

FOREIGN PATENT DOCUMENTS

| | | |
|---|---|---|
| CN | 102338904 | 2/2012 |
| CN | 102338904 A | 2/2012 |
| CN | 102398338 | 4/2012 |
| CN | 102809777 | 12/2012 |
| CN | 102873957 | 1/2013 |
| CN | 103162177 | 6/2013 |
| CN | 203286373 | 11/2013 |
| CN | 203286373 U | 11/2013 |
| CN | 103471037 A | 12/2013 |
| CN | 103471037 | 1/2014 |
| CN | 103487867 | 1/2014 |
| CN | 103487867 A | 1/2014 |
| JP | 2014063697 | 4/2014 |
| JP | 2014063697 A | 4/2014 |
| TW | 201350941 | 6/2012 |
| WO | 2011043466 | 4/2011 |

OTHER PUBLICATIONS

Office Action and Search Report, dated Feb. 3, 2017, for Chinese Patent Application No. 201410855642.X.
Search Report and Written Opinion, dated Sep. 22, 2015, in International Application No. PCT/CN2015/071223.
Chinese Office Action and Search Report for Chinese Patent Application No. 201410855642.X dated Aug. 24, 2017.

* cited by examiner

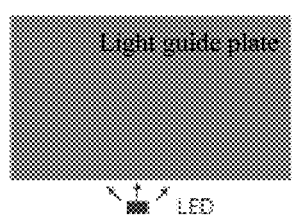
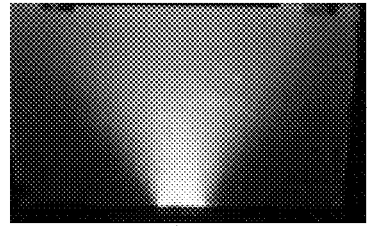
Fig. 1a          Fig. 1b
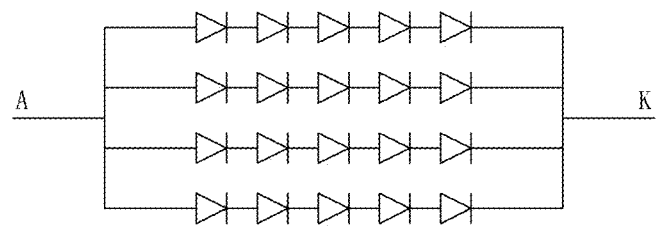
Fig. 2
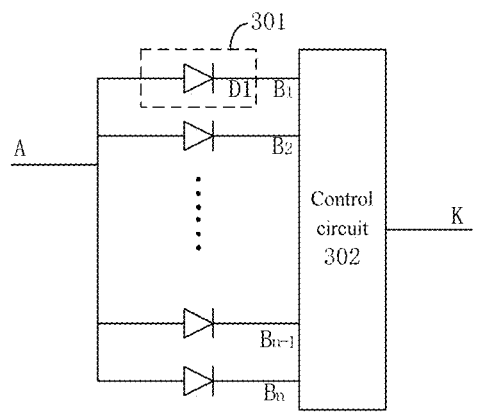
Fig. 3

LIGHT GUIDE PLATE, BACKLIGHT MODULE OF LIQUID CRYSTAL DISPLAY PANEL, AND DEVICE FOR MANUFACTURING LIGHT GUIDE PLATE

CROSS-REFERENCE TO RELATED APPLICATIONS

The present application claims benefit of Chinese patent application CN 201410855642.X, entitled "Light guide plate, backlight module of liquid crystal display panel, and device for manufacturing light guide plate" and filed on Dec. 31, 2014, the entirety of which is incorporated herein by reference.

FIELD OF THE INVENTION

The present disclosure relates to the technical field of liquid crystal displays, and in particular, to a light guide plate, a backlight module of a liquid crystal display panel, and a device for manufacturing the light guide plate.

BACKGROUND OF THE INVENTION

As mobile technologies develop, mobile phones have become indispensible means of communication in daily life. Currently, liquid crystal displays (LCDs for short) are most commonly used display screens in mobile phones. The liquid crystal display technologies have been developed all the way from black and white screens to color screens, and from twisted nematic liquid crystal displays (TN-LCDs) to thin film transistor liquid crystal displays (TFT-LCDs).

FIG. 1a and FIG. 1b respectively show the structure of an existing backlight module, and a light guide effect of an existing light guide plate. As shown in FIG. 1a, the existing backlight module adopts a side light source. That is, an LED, as the light source, is provided at a side surface of the light guide plate. When the LED is activated, light emitted therefrom enters the light guide plate from the side surfer thereof. From the light guide effect of the existing light guide plate as shown in FIG. 1b, it can be seen that, light that has entered the light guide plate is in a divergent form. This indicates that the existing light guide plate is incapable of imposing a light convergence effect on the light that has entered the light guide plate, which causes easy occurrence of light crosstalk in the light guide plate.

In view of the above, there is an urgent need of a light guide plate which can effectively prevent occurrence of light crosstalk therein.

SUMMARY OF THE INVENTION

The problem to be solved by the present disclosure is how to prevent occurrence of light crosstalk within a light guide plate. In order to solve such a problem, at the outset, a light guide plate is provided in the embodiments of the present disclosure, comprising a first surface and a second surface parallel with each other, wherein the first surface is formed with parallel columnar projections, and the second surface is formed with light guide ports.

According to one embodiment of the present disclosure, the second surface is formed with parallel columnar projections also, and the light guide ports are formed on the columnar projections of the second surface.

According to one embodiment of the present disclosure, adjacent columnar projections are spaced from each other by a predetermined distance.

According to one embodiment of the present disclosure, the light guide ports are inhomogeneously distributed along a direction parallel with the columnar projections.

According to one embodiment of the present disclosure, two adjacent light guide ports located on one and a same columnar projection has a shorter spacing distance from each other as the columnar projection goes further away from a first end of the columnar projections.

The present disclosure further provides a backlight module of a liquid crystal display panel, wherein the backlight module comprises a light guide plate, and a light source circuit arranged on a side surface of the light guide plate. The light guide plate is as described in any one of the above embodiments, and light that has entered the light guide plate from a side surface thereof exits from a front surface thereof after being processed in the light guide plate.

The present disclosure further provides a device for manufacturing the light guide plate, comprising: a melting furnace, used for melting raw material of the light guide plate and outputting melted raw material; a rolling portion, used for rolling the raw material of the light guide plate from the melting furnace, to form the light guide plate having the first surface and the second surface parallel with each other, wherein the first surface is formed with parallel columnar projections; and a transmission portion, used for transmitting the light guide plate from the rolling portion downstream along a production line, the transmission portion comprising a plurality of elastic rollers arranged side by side with one another for supporting and transmitting the light guide plate from the rolling portion.

According to one embodiment of the present disclosure, the rolling portion comprises a first roller and a second roller cooperating with each other to rotate, and the first roller and/or the second roller is provided with projections.

According to one embodiment of the present disclosure, the projections on the first roller and/or the second roller are arranged along a circumferential direction.

According to one embodiment of the present disclosure, the device further comprises a film coating portion, used for perform film coating on the light guide plate from the transmission portion, so as to form a protective film on the light guide plate.

Compared with the light source circuit of an existing backlight module, the light source circuit in the backlight module provided in the present disclosure can achieve separate control over each of a plurality of light-emitting units. Thus, where it is unnecessary to activate all of the plurality of light-emitting units as per the display requirements of the liquid crystal display device, the control circuit can activate the desired light-emitting units, and meanwhile deactivate the undesired light-emitting units. Since it is unnecessary to activate all of the plurality of light-emitting units, energy consumption of the backlight module can be effectively reduced, thereby prolonging the service life of an electric device, such as a mobile phone.

In addition, the light source circuit provided in the present disclosure can also be used to adjust brightness of a light source. Specifically, a controllable switch can be used to adjust a time duration in which an LED is being activated or deactivated through adjustment of a duty cycle of a control signal. Within a certain time period, the longer the LED is being activated, the brighter the light source will appear. On the contrary, within such a time period, the shorter the LED is being activated, the darker the light source will appear. As such, adjustment of brightness of the light source has been achieved.

The light guide plate of the present disclosure is provided with the parallel columnar projections on the surface thereof. These columnar projections enable light to be in a relative convergent state while being transmitted in the light guide plate. Therefore, as compared with an existing light guide plate, the light guide plate provided in the present disclosure has a better light convergent effect. This can significantly attenuate light crosstalk in the light guide plate.

In order to guarantee homogeneity of light exiting from the surface of the light guide plate, the plurality of light guide ports of the present disclosure is distributed in an inhomogeneous manner on the light guide plate. Specifically, among all the columnar projections provided with the light guide ports, two adjacent light guide ports located on one and a same columnar projection has a shorter spacing distance from each other, i.e., the light guide ports are more intensively distributed, as the columnar projection goes further away from a first end of the columnar projections, i.e., an end adjacent to the plurality of light-emitting units.

More light exits from each of the light guide ports adjacent to the plurality of light-emitting units, but the light guide ports are quite sparsely distributed in a position adjacent to the plurality of light-emitting units; while less light exits from each of the light guide ports away from the plurality of light-emitting units, but the light guide ports are quite intensively distributed in a position away from the plurality of light-emitting units. This allows light exiting from a plurality of regions of the light guide plate to be quite homogeneous, thereby ensuring homogenous light exiting from the surface of the light guide plate.

Other features and advantages of the present disclosure will be further explained in the following description, and partly become self-evident therefrom, or be understood through implementing the present disclosure. The objectives and other advantages of the present disclosure will be achieved through the structure specifically pointed out in the description, claims, and the accompanying drawings.

BRIEF DESCRIPTION OF THE DRAWINGS

In order to explain the technical solution of the embodiments of the present disclosure or the technical solution in the prior art in a clearer manner, the accompanying drawings used in describing the prior art or the embodiments of the present disclosure are briefly introduced as follows, in which:

FIG. 1a shows the structure of an existing backlight module;

FIG. 1b shows an optical pathway effect diagram in an existing light guide plate;

FIG. 2 shows a circuit diagram of a light source circuit in a backlight module of an existing liquid crystal display panel;

FIG. 3 shows a circuit diagram of a light source circuit in a backlight module according to one embodiment of the present disclosure;

DETAILED DESCRIPTION OF THE EMBODIMENTS

Figure 4:
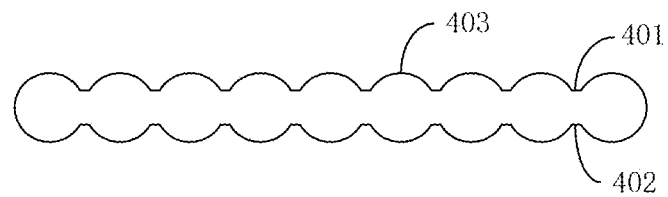
FIGS. 4 and 5 respectively show a front view and a top view of a light guide plate according to one embodiment of the present disclosure.

The present disclosure will be explained in detail with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined together in any manner, and the technical solutions obtained in this manner all fall within the scope of the present disclosure.

Meanwhile, various specific details are expounded in the following to provide a thorough understanding of the embodiments of the present disclosure. However, it is obvious for a person skilled in the art that, the present disclosure can be implemented through other specific details or in other specific manners than those described herein.

As the liquid crystal display technologies develop, a liquid crystal display device used in a mobile phone is becoming increasingly larger in size, which leads to increasing energy consumption by the liquid crystal display device. A backlight module is a major energy consuming unit in the liquid crystal display device. FIG. 2 shows a circuit diagram of a light source circuit in an existing backlight module. As indicated in FIG. 2, the existing light source circuit is formed by a plurality of LED circuits in parallel connection to one another, wherein each of the plurality of LED circuits includes a plurality of LEDs in series connection to one another. Such a structure of the light source circuit renders, during operation of the liquid crystal display device of the mobile phone, all of the plurality of LEDs in the light source circuit activated, i.e., 100% energy consumption of a lighting circuit, regardless of variations of images displayed by the liquid crystal display device in distribution of light and dark or in requirements for light and dark.

Such a structure of the existing backlight module causes the energy consumption of the liquid crystal display screen to account for 60-70% of the entire energy consumption of the mobile phone. Due to limitation of battery capacity of the mobile phone, such a high energy consumption of the liquid crystal display screen has sharply cut down standby time of the mobile phone.

In order to solve the problem of excessive energy consumption by the existing backlight module of a liquid crystal display device, provided in this embodiment is a backlight module of a liquid crystal display device capable of controlling the states of activation and deactivation of each of the plurality of light-emitting units separately. The backlight module comprises a light source circuit and a light guide plate.

FIG. 3 shows a circuit diagram of the light source circuit in the backlight module.

As shown in FIG. 3, the light source circuit provided in this embodiment comprises a control circuit 302 and a plurality of light-emitting units 301, each of which is connected to a corresponding port of the control circuit 302, so as to be activated or deactivated under control of the control circuit 302. In the embodiment as shown in FIG. 3, the plurality of light-emitting units is provided on a side surface of the light guide plate, and serves as a side light source of the light guide plate. The light guide plate is capable of processing light that has entered the light guide plate from the side surface thereof, and causes the light to exit from a front surface thereof. That is, the light guide plate can transform the side light source into a surface light source.

In the embodiment as shown in FIG. 3, each of the plurality of light-emitting units has a first port connected to a pre-arranged power supply, and a second port connected to the corresponding port of the control circuit 302. As shown in FIG. 3, the backlight module provided in this embodiment employs a plurality of LEDs as the plurality of light-emitting units. Each of the plurality of LEDs has a positive electrode connected to a positive electrode (port A) of a pre-arranged power supply, and a negative electrode connected to the corresponding port of the control circuit 302.

In the present embodiment, the control circuit 302 comprises a controllable switch, which includes a first port and a plurality of second ports, wherein the first port of the controllable switch is connected to a negative electrode (port K) of the pre-arranged power supply, while each of the plurality of second ports is connected to the negative electrode of a corresponding LED.

When an LED D1 is required to be activated, connection between a port B1 and a port K will be enabled by the controllable switch. At such a moment, the LED D1 is exerted with an operating voltage at two ends thereof, and thus emits light outwardly. As the controllable switch can control connection or disconnection between each of the plurality of ports (ports B1-Bn) connected to a corresponding LED and the port K separately, the controllable switch can thus control activation or deactivation of each of the plurality of LEDs separately. That is, the controllable switch can control simultaneous activation or deactivation of one or more of the plurality of LEDs.

Compared with the light source of the existing backlight module, the light source circuit provided in this embodiment can achieve separate control over each of the plurality of light-emitting units. Thus, when it is unnecessary to activate all of the plurality of light-emitting units as per a display requirement of the liquid crystal display device, the control circuit can activate the desired light-emitting units, and meanwhile deactivate the undesired light-emitting units. Because it is unnecessary to activate all of the plurality of light-emitting units, energy consumption of the backlight module can be effectively reduced. Compared with the existing light source circuit, the light source circuit of the present embodiment can show a reduction of 40% in energy consumption. This can also effectively prolong service life of an electric device, such as a mobile phone.

In addition, the light source circuit provided in this embodiment can be used to adjust brightness of a light source also. Specifically, in the present embodiment, the controllable switch, through adjustment of a duty cycle of a control signal, can achieve adjustment of a duration in which the LED is being activated or deactivated. Within a certain time period, the longer the LED is being activated, the brighter the light source will appear. On the contrary, within such a time period, the shorter the LED is being activated, the darker the light source will appear. As such, adjustment of brightness has been achieved.

It should be noted that, the present disclosure is not limited to the above. In other embodiments of the present disclosure, the plurality of light-emitting units and/or the control circuit can also be achieved through other proper circuit forms. For example, in one embodiment of the present disclosure, the control circuit can be achieved through FPGA, which enables a switching circuit with a higher response speed, so as to enable more accurate control over the plurality of light-emitting units by the control circuit.

Figure 5:
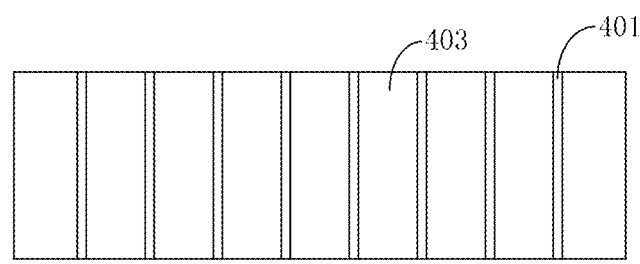

As it is impossible for an existing light guide plate to impose a light convergence effect on light that has entered the light guide plate, light crosstalk would easily occur in the light guide plate. In order to solve such a problem, the present embodiment further provides a light guide plate that can achieve a light convergence effect. FIGS. 4 and 5 respectively show a front view and a top view of the light guide plate provided in this embodiment. As indicated in FIGS. 4 and 5, the light guide plate provided in this embodiment comprises a first surface 401 and a second surface 402 parallel with each other, which are both provided with parallel columnar projections 403. Adjacent columnar projections are spaced from each other by a predetermined distance.

Figure 6:
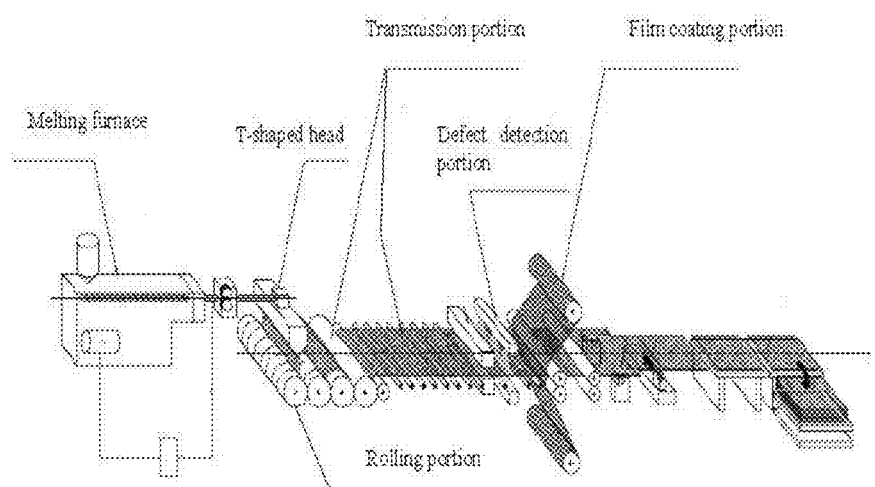
FIG. 6 schematically shows the structure of a device for manufacturing a light guide plate according to one embodiment of the present disclosure.

FIG. 6 shows a device for manufacturing the light guide plate as shown in FIGS. 4 and 5 of the present disclosure.

In the embodiment as shown in FIG. 6, the light guide plate is made of engineering plastic. In a production procedure, the engineering plastic is first melted into a liquid state in a melting furnace, followed by transmission of the liquid state engineering plastic into a rolling portion through a T-shaped head, which is spaced from the rolling portion by a certain distance. The liquid state engineering plastic, after being output from the T-shaped head, will cool down slowly while descending, such that the engineering plastic will not completely cool down when arriving at the rolling portion. This can facilitate roll forming.

In the embodiment as shown in FIG. 6, the rolling portion of the device for manufacturing the light guide plate comprises a first roller and a second roller cooperating with each other to rotate. Because it is required to form columnar projections on both the first surface and the second surface of the light guide plate, in the present embodiment, the first roller and the second roller are both provided with projections. The first roller and the second roller can perform rolling on the incompletely cooled engineering plastic from the T-shaped head, so as to form a light guide plate structure as shown in FIGS. 4 and 5.

In a different embodiment of the present disclosure, the projections on the roller can be a plurality of projections arranged on a surface of a rolling axis along a circumferential direction thereof, or can be a plurality of columnar projections arranged on the surface of the rolling axis along an axial direction thereof. In the present embodiment, the projections are arranged on the first roller and the second roller along respective circumferential projections thereof. Such a roller having the projections arranged along the circumferential direction thereof, while rolling the engineering plastic, will not form any enclosed spaces between the projections and the rolling axis, thereby enabling effective discharge of air from the engineering plastic. Such a structure of the roller also enables a rolled light guide plate to have a more homogeneous structure, and fewer impurities contained therein, thus ensuring superior light guide properties of the light guide plate.

The rolling portion, after completely rolling the engineering plastic, will transmit the light guide plate formed to the transmission portion, so as to be transmitted along a production line downstream. As the light guide plate from the rolling portion has not been completely cooled down, the light guide plate will be further cooled while being transmitted on the transmission portion. In order to prevent the light guide plate from being damaged in such a step, in the present embodiment, the transmission portion includes a plurality of elastic rollers arranged side by side with one another, for supporting and transmitting the light guide plate from the rolling portion.

While the rolled light guide plate is being transmitted on the transmission portion, a defect detection portion of the device will perform defect detection on the light guide plate, so as to ensure a complete and reliable structure of the light guide plate. In addition, the light guide plate as has been manufactured has columnar projections, which causes easy deposition of ash between and among the projections. Hence, after defect detection, the device for manufacturing a light guide plate of the present embodiment will further perform film coating on the light guide plate, so as to coat protective films on an upper surface and a lower surface of the light guide plate, respectively. Such protective films are capable of not only effectively ensuring cleanness of the light guide plate, but also protecting the surfaces of the light guide plate from being damaged. In the present embodiment, the protective films coated on the light guide plate are adhesive films. In other embodiments of the present disclosure, of course, the light guide plate can also be coated with other proper protective films. The present disclosure is not limited hereto.

Finally, a cutting step can be performed on the light guide plate coated with films, so as to obtain a light guide plate with a required size.

Figure 7:
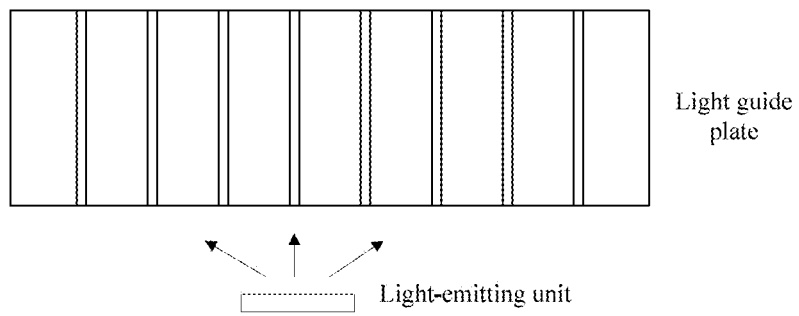
FIG. 7 schematically shows the structure of a backlight module according to one embodiment of the present disclosure.
Figure 8:
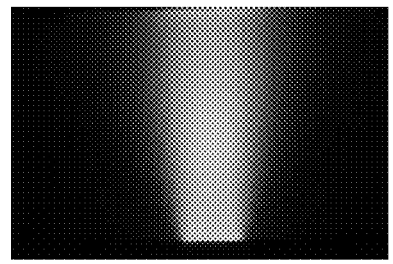
FIG. 8 shows an optical pathway effect diagram in a light guide plate when one light-emitting unit is activated according to one embodiment of the present disclosure.

In order to present light convergence properties of the light guide plate as shown in FIGS. 4 and 5 more explicitly, in the present embodiment as shown in FIG. 7, the plurality of light-emitting units is placed on the side surface of the light guide plate, and on normal working conditions with the power supply thereof being enabled. FIG. 8 shows an optical pathway diagram in the light guide plate when one of the plurality of light-emitting units is activated; and FIG. 9 shows an optical pathway diagram in the light guide plate when more than one of the plurality of light-emitting units is activated.

Figure 9:
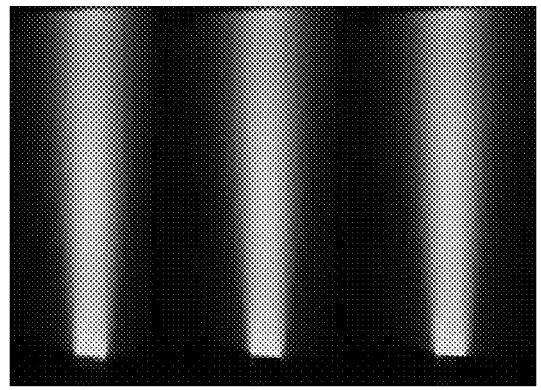
FIG. 9 shows an optical pathway effect diagram in a light guide plate when a plurality of light-emitting units is activated according to one embodiment of the present disclosure.

As can be seen from FIGS. 8 and 9, because the columnar projections provided on the light guide plate of the present embodiment enable light to be in a relative convergent state when being transmitted in the light guide plate, the light guide plate of the present embodiment, as compared with the existing light guide plate, has a better light convergence effect. This can significantly attenuate light crosstalk in the light guide plate.

As one of the functions of the light guide plate is to transform a side light source into a surface light source, it is necessary for light in the light guide plate to exit from the surface of the light guide plate. However, the light in the light guide plate is transmitted through total reflection. In order to enable light to exit from the surface of the light guide plate, it is necessary to destroy a total reflection structure of the light guide plate.

Figure 10:
FIG. 10 shows an optical pathway diagram in a light guide plate according to one embodiment of the present disclosure.
Figure 11:
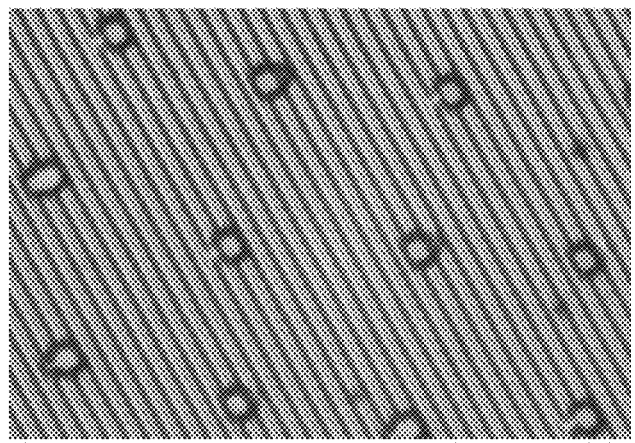
FIG. 11 schematically shows arrangement of light guide ports in a light guide plate according to one embodiment of the present disclosure.

As shown in FIG. 10, a light guide port can be arranged on the columnar projection of the light guide plate provided in the present embodiment, to destroy such a total reflection structure of the light guide plate. Thus, a portion of the light in the light guide plate can exit from this light guide port, so as to realize the function of transformation from a side light source to a surface light source. In the embodiment as shown in FIG. 11, a plurality of light guide ports is all arranged on the columnar projections on the second surface of the light guide plate, thus preventing the light from exiting from the first surface of the light guide plate. This can ensure utilization of the light emitted from the light source circuit, thereby enhancing brightness of the backlight module.

As the plurality of light-emitting units is provided on one side of the light guide plate, and light that has entered the light guide plate will exit from the plurality of light guide ports, less light will exit from a light guide port further away from the plurality of light-emitting units. In order to guarantee homogeneity of light exiting from the surface of the light guide plate, in the present embodiment, the plurality of light guide ports is distributed in an inhomogeneous manner on the light guide plate. Specifically, among the plurality of columnar projections provided with the light guide ports, two adjacent light guide ports located on one and a same columnar projection has a shorter spacing distance from each other, i.e., the light guide ports are more intensively distributed, as the columnar projection goes further away from a first end of the columnar projections, i.e., an end adjacent to the plurality of light-emitting units.

More light exits from each of the light guide ports adjacent to the plurality of light-emitting units, but the light guide ports are quite sparsely distributed in a position adjacent to the plurality of light-emitting units; while less light exits from each of the light guide ports away from the plurality of light-emitting units, but the light guide ports are quite intensively distributed in a position away from the plurality of light-emitting units. This enables light exiting from a plurality of regions of the light guide plate to be quite homogeneous, thereby ensuring homogenous light exiting from the surface of the light guide plate.

It should be noted that, the present disclosure is not limited to the above embodiments. In other embodiments of the present disclosure, other proper means can be used to ensure homogenous light exiting from the light guide plate.

Figure 12:
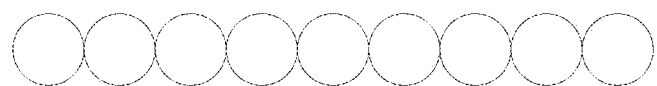
FIGS. 12 and 13 respectively show a front view and a top view of a light guide plate according to another embodiment of the present disclosure.
Figure 13:
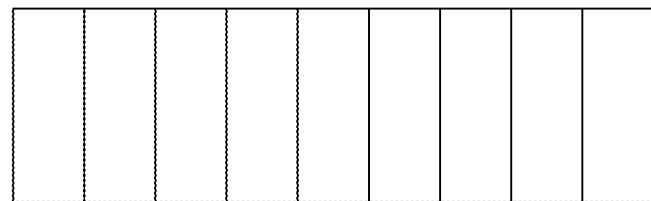

In one embodiment of the present disclosure, the light guide plate can also have a structure as shown in FIGS. 12 and 13. FIGS. 12 and 13 respectively show a front view and a top view of the light guide plate. It can be seen from these two figures, as compared with the light guide plate shown in FIGS. 4 and 5, the light guide plate shown in FIGS. 12 and 13 is not provided with a space between any two adjacent columnar projections. Moreover, the first surface and the second surface are located in one and a same plane. Hence, the light guide plate can be deemed as being formed by a plurality of cylinders arranged side by side.

Figure 14:
FIG. 14 schematically shows the structure of a light guide plate according to still another embodiment of the present disclosure.

In another embodiment of the present disclosure, the light guide plate can have a structure as shown in FIG. 14 also. It can be seen that, as compared with the light guide plate shown in FIG. 4, the light guide plate shown in FIG. 14 only has the first surface formed with the columnar projections, while the second surface thereof is a flat structure. In the embodiment as shown in FIG. 14, the plurality of light guide ports are all provided on the second surface. This is because the second surface is a flat structure, and it is easier to form the light guide ports on a flat structure, for example, by means of wet etching. It is relatively difficult to form a light guide port on the columnar projection of the first surface, usually requiring a laser etching procedure, etc. Therefore, if the light guide port is to be formed on the columnar projection arranged on the first surface, the procedure for manufacturing the light guide plate would be apparently more difficult, and the costs thereof would be also obviously increased. Of course, the present disclosure is not limited hereto. Where technologies and costs allow, the light guide ports can be arranged on the columnar projections of the first surface also. Correspondingly, only one of the first roller and the second roller of the rolling portion of the device for manufacturing the light guide plate will be provided with the projections.

Figure 15:
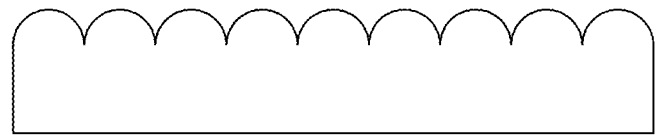
FIG. 15 schematically shows the structure of a light guide plate according to a further embodiment of the present disclosure.

In still another embodiment of the present disclosure, the light guide plate can have a structure as shown in FIG. 15. As can be seen in view of FIG. 14, the structure of the light guide plate of FIG. 15 is the same as that of the light guide plate shown in FIG. 14, except that the light guide plate of FIG. 15 has no space provided between any two adjacent columnar projections thereof. Hence, the light guide plate of FIG. 15 will not be repeatedly explained herein.

Compared with the light source circuit of the existing backlight module, the light source circuit in the backlight module provided in the present disclosure can achieve separate control over each of the plurality of light-emitting units. Thus, where it is unnecessary to activate all of the plurality of light-emitting units as per the display requirements of the liquid crystal display device, the control circuit can activate the desired light-emitting units, and meanwhile deactivate the undesired light-emitting units. Since it is unnecessary to activate all of the plurality of light-emitting units, energy consumption of the backlight module can be effectively reduced, thereby prolonging the service life of an electric device.

In addition, the light source circuit provided in the present disclosure can also be used to adjust brightness of a light source. Specifically, the controllable switch can be used to adjust a time duration in which the LED is being activated or deactivated through adjustment of a duty cycle of the control signal. Within a certain time period, the longer the LED is being activated, the brighter the light source will appear. On the contrary, within such a time period, the shorter the LED is being activated, the darker the light source will appear. As such, adjustment of brightness of the light source has been achieved.

The light guide plate of the present disclosure is provided with the parallel columnar projections on the surface thereof. These columnar projections enable light to be in a relative convergent state while being transmitted in the light guide plate. Therefore, as compared with the existing light guide plate, the light guide plate provided in the present disclosure has a better light convergence effect. This can significantly attenuate light crosstalk in the light guide plate.

In order to guarantee homogeneity of light exiting from the surface of the light guide plate, the plurality of light guide ports of the present disclosure is distributed in an inhomogeneous manner on the light guide plate. Specifically, among all the columnar projections provided with the light guide ports, two adjacent light guide ports located on one and a same columnar projection has a shorter spacing distance from each other, i.e., the light guide ports are more intensively distributed, as the columnar projection goes further away from a first end of the columnar projections, i.e., an end adjacent to the plurality of light-emitting units.

More light exits from each of the light guide ports adjacent to the plurality of light-emitting units, but the light guide ports are quite sparsely distributed in a position adjacent to the plurality of light-emitting units; while less light exits from each of the light guide ports away from the plurality of light-emitting units, but the light guide ports are quite intensively distributed in a position away from the plurality of light-emitting units. This allows light exiting from a plurality of regions of the light guide plate to be quite homogeneous, thereby ensuring homogenous light exiting from the surface of the light guide plate.

It could be understood that, the embodiments disclosed herein are not limited by the specific structures, treatment steps, or materials disclosed herein, but incorporate the equivalent substitutes of these features which are comprehensible to those skilled in the art. It could be also understood that, the terms used herein are used for describing the specific embodiments, not for limiting them.

The phrases "one embodiment" or "embodiments" referred to herein mean that the descriptions of specific features, structures and characteristics in combination with the embodiments are included in at least one embodiment of the present disclosure. Therefore, the phrases "one embodiment" or "embodiments" that have appeared in different parts of the whole description do not necessarily refer to the same embodiment.

For the purpose of convenience, a plurality of items, structural units, component units and/or materials used herein can be listed in a common list. However, the list shall be understood in a way that each element thereof represents an only and unique member. Therefore, when there is no other explanation, none of the members of the list can be understood as an actual equivalent of other members in the same list only based on the fact that they appear in the same list. In addition, the embodiments and examples of the present disclosure can be explained with reference to the substitutes of each of the components. It could be understood that, the embodiments, examples and substitutes herein shall not be interpreted as the equivalents of one another, but shall be considered as separate and independent representatives of the present disclosure.

In addition, the features, structures and characteristics described herein can be combined with one another in any other suitable way in one embodiment or a plurality of embodiments. The specific details, such as lengths, widths and shapes, described herein are used for providing a comprehensive understanding of the embodiments of the present disclosure. However, it is understandable for those skilled in the art that, the present disclosure may be implemented in other ways different from the specific details specified herein, or may be implemented in other methods, components and materials. The structures, materials and operations known to all are not shown or described in the examples to avoid blurring various aspects of the present disclosure.

The embodiments are described hereinabove to interpret the principles of the present disclosure in one application or a plurality of applications. However, those skilled in the art, without departing from the principles and thoughts of the present disclosure, can make various modifications to the forms, usages and details of the embodiments of the present disclosure without any creative work. Therefore, the protection scope of the present disclosure shall be determined by the claims.

The invention claimed is:

1. A light guide plate, comprising a first surface and a second surface parallel with each other, wherein the first surface is formed with parallel columnar projections, and the second surface is formed with light guide ports, wherein adjacent columnar projections are spaced from each other by a predetermined distance, wherein the light guide ports are inhomogeneously distributed along a direction parallel with the columnar projections, and wherein two adjacent light guide ports located on one and a same columnar projection have a shorter spacing distance from each other as the columnar projection goes further away from a first end of the columnar projections.

2. The light guide plate according to claim 1, wherein the second surface is formed with parallel columnar projections also, and the light guide ports are formed on the columnar projections of the second surface.

3. A backlight module of a liquid crystal display panel, wherein the backlight module comprises:

a light guide plate, including a first surface and a second surface parallel with each other, wherein the first surface is formed with parallel columnar projections, and the second surface is formed with light guide ports, wherein light that has entered the light guide plate from a side surface thereof exits from a front surface thereof after being processed in the light guide plate, wherein adjacent columnar projections are spaced from each other by a predetermined distance, wherein the light guide ports are inhomogeneously distributed along a direction parallel with the columnar projections, and wherein two adjacent light guide ports located on one and a same columnar projection has a shorter spacing distance from each other as the columnar projection goes further away from a first end of the columnar projections; and a light source circuit arranged on the side surface of the light guide plate.

4. The backlight module of a liquid crystal display panel according to claim 3, wherein the second surface is formed with parallel columnar projections also, and the light guide ports are formed on the columnar projections of the second surface.

* * * * *